Dec. 17, 1935.  F. C. BINNALL  2,024,270
FLUSH VALVE
Filed April 14, 1931
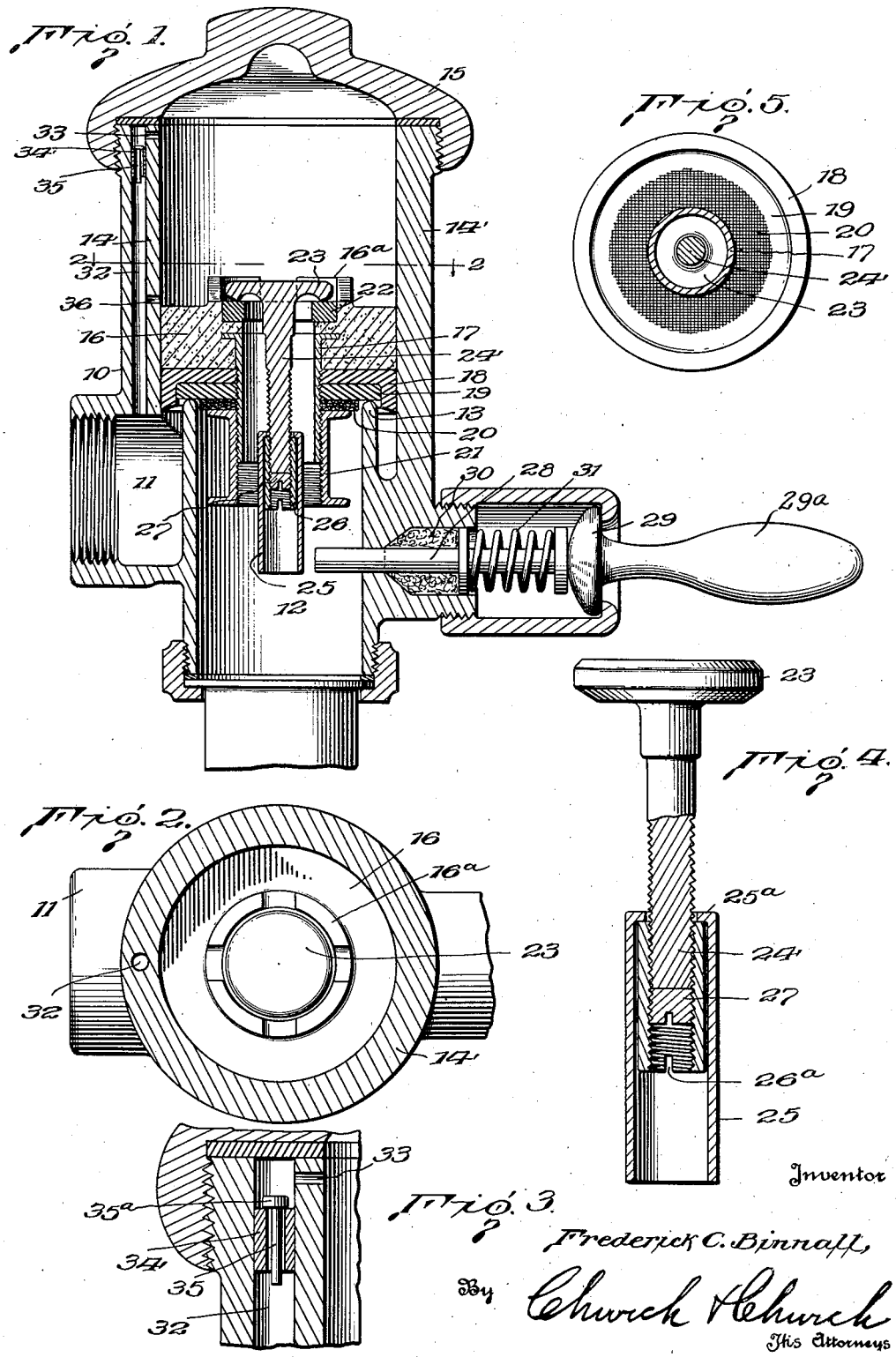
Inventor
Frederick C. Binnall,
By Church & Church
His Attorneys Patented Dec. 17, 1935

2,024,270

UNITED STATES PATENT OFFICE 2,024,270

FLUSH VALVE

Frederick C. Binnall, Washington, D. C., assignor to Tradewald Corporation, Washington, D. C., a corporation of Delaware Application April 14, 1931, Serial No. 530,088

10 Claims. (Cl. 137—93)

My invention relates to flush valves and has to do, more particularly, with flush valves of the type in which there is a chamber, a main valve, a hydrostatic element associated with the chamber and coupled to the main valve, and a control valve for relieving pressure within the chamber to effect operation of the main valve.

The primary object of my invention is to provide a flush valve which is substantially silent in operation.

Another object of my invention is to provide an improved valve of this type which is characterized by longer life, greater dependability, and permanence of adjustment.

A further object of my invention is to provide a valve element, for use in flushing devices of the type described, which is not subject to fouling by acid or alkali impurities commonly found in water of municipal systems.

Further objects and objects relating to details and economies of construction will definitely appear from the detailed description to follow. In one instance, I accomplish the objects of my invention by the means set forth in the following specification. My invention is clearly defined and pointed out in the appended claims. A structure constituting a preferred embodiment of my invention is illustrated in the accompanying drawing forming a part of my specification, in which:—

Figure 1 is a vertical sectional view through a preferred flush valve construction embodying my invention;

Fig. 2 is a horizontal sectional view taken on the line 2—2 of Fig. 1;

Fig. 3 is a detail sectional view of the removable flow restricting member disposed in the chamber charging duct;

Fig. 4 is a detail view of the control valve, the adjustable stem thereof being shown in section; and Fig. 5 is a detail plan view of the lower face of the main valve.

In the drawing, the same reference numerals refer to the same parts throughout the several views.

Referring to the numbered parts of the drawing, there is shown a preferred embodiment of my invention which comprises a casing 10 having an inlet connection or port 11, an outlet port 12 which extends upwardly into the casing proper and terminates in a valve seat 13, a cylinder 14 disposed directly above the valve seat 13, in alinement therewith, and a threaded cap 15 closing the outer end of the cylinder 14. A plunger constituting the main valve is disposed for movement in the cylinder 14 and comprises a piston head 16 formed of hard rubber, a tubular stem 17 secured in head 16 and depending therefrom, as by molding said head around the upper end of said stem, a cup-like sealing element 18 of pliant material, constituting the piston skirt, a valve seat engaging washer 19 of resilient material, a muffling washer 20 formed of a number of thicknesses of wire gauze, and a spool-shaped assembly nut 21 threaded upon the lower end of the stem 17. The head 16 is provided with a central aperture and is recessed about said aperture to receive a resilient washer 22 which constitutes the seat for the control valve 23, the pendant stem 24 of which extends loosely through the tubular stem 17 of the main valve. The control valve 23 is centered with respect to the washer 22 by a slotted ring 16ª formed integral with the head 16. A freely slidable sleeve 25 is carried upon the stem 24 and by means of a long tubular nut 26 threaded upon the stem and engaging the inturned lip 25a of the sleeve, the maximum expanded length of stem 24 and sleeve 25 may be readily regulated. For facilitating the making of adjustments, the lower end of nut 26 is preferably slotted as at 26ª to receive the blade of a screw driver or similar tool. A set screw 27 is screwed into the threads of the nut 26 to abut the end of stem 24 and lock the nut 26 against loosening. The sleeve extension 25 extends below the end of the stem 17 and the nut 21, and is adapted to be engaged by conventional control valve operating means consisting of a plunger 28 which extends through the wall of the casing 10 and a manually operable cam device 29. A packing element 30 and a plunger returning spring 31 of conventional form are also provided. For the purpose of slowly charging cylinder 14 with fluid and restoring the main valve to its seat when sufficient flushing has taken place, there is provided a charging duct 32 which leads from the inlet port 11 to the top of cylinder 14 terminating in a restricted by-pass 33. Duct 32 is accessible by removing cap 15 and is restricted at its upper end adjacent by-pass 33. This restriction may be provided in a number of ways, but consists preferably of a tubular member 34 pressed into the duct 32 and a pin 35 loosely disposed in the tubular member 33 with its head 35ª resting thereon and retaining the pin against dissociation therefrom. Movements of the pin 35 in accordance with fluid flow through the passage in the tubular member 34 prevent the lodging of foreign matter therein.

In devices of this character, the plunger constituting the main valve must descend slowly to provide a sufficient period of flushing, and as it approaches the end of its downward movement and the flow of flushing fluid past the valve seat is being restricted, more and more resistance against seating is encountered due to the building up of pressure against the underside of the plunger. Accordingly, the final seating movement of the valve is extremely slow, and the flushing fluid escaping past the valve during this period sets up singing and whistling sounds which are extremely annoying and embarrassing. To eliminate this undesirable feature, I have provided an additional or auxiliary cylinder charging by-pass 36 through which fluid flows only during the final seating stage of the main valve. By-pass 36 is connected with duct 32 in a manner similar to by-pass 33, but has several times the capacity of by-pass 33. It is located well down along the cylinder 14 and is uncovered by the plunger head 16 only when the valve element 19 has so closely approached valve seat 13 as to materially interrupt the flow of fluid past the seat and cause the unpleasant sounds mentioned. At this period in the operation of the valve, flushing, in so far as its intended and beneficial effects are concerned, has been completed. Because of the large capacity of the by-pass 36, seating of the valve is almost instantaneous after by-pass 36 has been cleared by the piston head 16. Since the plunger has already reached substantially the end of its stroke before by-pass 36 is brought into operation, there is no hammering of the valve against its seat in closing. By-pass 33 may be constructed to pass as little fluid as desired to thereby extend the flushing period far beyond the limits generally necessary or desired, yet, when flushing has been completed, the valve will close quickly and quietly without whistling, screaming, or hammering noises.

From the above description, the operation of the valve construction disclosed should be easily understood. The valve is normally closed as shown in Fig. 1. Upon movement of cam device 29 as by pressing downwardly upon handle portion 29ª, plunger 28 is pressed against the sleeve 25 tilting stem 17 and unseating the control valve 23, discharging a portion of the fluid in cylinder 14 through tubular stem 17 into outlet port 12. Plunger head 16 immediately rises under the influence of pressure in inlet port 11, to compensate for the fluid discharged. Valve element 19 is carried upwardly with plunger 16 clearing its seat 13 and flushing takes place. Upon release of cam device 29, or upon the rising of the plunger to such extent that sleeve 25 clears the end of plunger 28, the control valve again seats and fluid from inlet port 11 passes upwardly through duct 32, tubular member 34, and through by-pass 33, slowly recharging cylinder 14 and causing plunger 16 to slowly descend. When the plunger has descended to the point that the flushing flow is being interrupted by valve element 19 plunger head 16 clears by-pass 36 and a greatly increased flow of fluid passes from duct 32 into cylinder 14, forcing plunger 16 down rapidly and seating valve element 19. By reason of the adjustable character of the sleeve 25, it is possible to limit the maximum period of flushing without changing the adjustment of the rate of charging flow through by-pass 33.

So, if the sleeve 25 is adjusted to an elevated position on stem 24, even though the cam 29 be operated to hold plunger 28 extended against its spring, the sleeve 25, in its upward movement with the other parts of the main valve plunger, will soon clear the end of plunger 28 and valve 23 will be seated. The limited amount of fluid discharged from the cylinder 14 during this short period will be quickly replaced by charging fluid entering through duct 32, and the period of flushing will be correspondingly brief. As is true in conventional devices, by reason of the slidable character of sleeve 25, valve 23 will remain seated upon the return of the main valve plunger even though the plunger 28 be held extended to prevent the sleeve 25 from assuming its normal pendant position. When sleeve 25 is adjusted to a low position upon valve stem 24, if the plunger 28 be held extended, valve 23 will be unseated for a longer period and the flushing period will be correspondingly greater.

Several features of the disclosed flush valve contribute to provide its noiseless character. The non-metallic valve elements 19 and 22 eliminate hammering noises. The gauze washer 20, and the spool-shaped nut 21 gently restrict and lead the flushing stream into the outlet port 12 during the initial opening and the final closing periods, and do much to quiet the sounds normally occurring due to the water rushing past the valve seat 13. And lastly, the quick closing of the valve when flushing has been accomplished is the feature provided by the auxiliary duct 36 and eliminates an especially disagreeable set of noises.

The novel piston of my valve operating plunger, by reason of its non-metallic character is not corrosively attacked by acid or alkali impurities in the water, nor is there formed thereon any hard cake as in the case of pistons having metal bodies. Further, the piston is light in weight and, therefore, sensitive. The head portion 16 in combination with the depending skirt portion of the cup-shaped member 18 contribute jointly to provide guiding means for insuring accurate seating of valve element 19 upon seat 13.

My non-metallic piston construction is not subject to corrosion or to the formation of hard insoluble deposits. It is light in weight, sensitive, and has less tendency to create valve noises. The head portion 16 in combination with the depending skirt portion 18 jointly constitute guiding means for the valve element 19 insuring accurate seating upon the valve seat 13. The assembly nut 21 extends below the piston proper and serves as a baffle to prevent the tilting of the valve stem sleeve 25 by the inrushing flushing stream when the valve element 19 is unseated.

I am also aware that the construction disclosed and described in this specification may be varied considerably without departing from the spirit of my invention. I, therefore, claim my invention broadly as indicated by the appended claims.

What I claim is:

1. In a flush valve, a casing having an inlet port, an outlet port and a valve seat intermediate said ports, a main valve element associated with said seat, a timing chamber connected with said inlet port by a restricted charging duct, a control valve governing a discharge port in said chamber, said discharge port being of greater capacity than the charging capacity of said duct and, when opened, effecting a reduction of fluid pressure in said chamber, hydrostatic means associated with said timing chamber and subject to pressures therein, said hydrostatic means opening said main valve when the chamber pressure falls below the pressure in the inlet port, and closing said main valve as the chamber pressure becomes equalized with the pressure in the inlet port, and means associated with said hydrostatic element for greatly increasing the charging flow to said chamber and effecting rapid seating of said main valve, said means becoming operative when said main valve has almost but not completely returned to its seat after having been opened.

2. In a flush valve, a casing having an inlet port, an outlet port, and a valve seat intermediate said ports, a main valve element associated with said seat, a timing cylinder connected with said inlet port by a restricted charging duct, a control valve governing a cylinder discharge port, said discharge port being of greater capacity than the charging capacity of said duct and when opened effecting a reduction of pressure within said cylinder, a piston coupled to said main valve and movable in said cylinder to open said valve when the pressure in said cylinder falls below the pressure in the inlet port, and movable to close said main valve when the pressure in said cylinder becomes equalized with the pressure in the inlet port, and means for effecting rapid final seating of said main valve, said means comprising an auxiliary cylinder charging duct extending through the side wall of said timing cylinder at a point just above and clear of the piston head when it is in valve seating position.

3. In a flush valve, a casing having an inlet port, an outlet port and a valve seat intermediate said ports, a timing cylinder disposed over and alined with said valve seat and connected with said inlet port by a restricted charging duct, a plunger movable in said cylinder, said plunger comprising a thick, molded centrally apertured disc-like head member formed of hard rubber or its equivalent, a tubular sleeve member disposed in the aperture of said head member, depending therefrom into said outlet port, having threads upon its lower portion and having a flange at its upper end which flange is imbedded and anchored in said molded head member, plunger packing means disposed about said sleeve member and including a portion seatable upon said valve seat to constitute a valve therefor, a nut threaded upon said sleeve member and clamping said packing means against said head member, a control valve seated upon said head member, closing the aperture therethrough, and having a stem extending through said sleeve member, and means for tilting said valve stem to unseat said control valve.

4. In a flush valve, a casing having an inlet port, an outlet port and a valve seat intermediate said ports, a timing cylinder disposed over and alined with said valve seat and connected with said inlet port by a restricted charging duct, a plunger movable in said cylinder, said plunger comprising a centrally apertured head member, a threaded tubular sleeve member depending from said head member and defining, with said aperture, a cylinder discharge port, plunger packing means disposed about said sleeve member beneath said head member and including a portion seatable upon said valve seat to constitute a valve therefor, a foraminous washer disposed beneath said packing means and arranged to extend within said outlet port only when said valve is seated or closely adjacent its seat, thus restricting and dividing the fluid then passing said seat into a plurality of small streams, a nut threaded upon said sleeve member and clamping said head member, packing means and foraminous washer in assembly, a control valve seated upon said head member, closing the aperture therethrough, and having a stem extending through said sleeve member, and means for tilting said valve stem to unseat said control valve.

5. In a flush valve, a casing having an inlet port, an outlet port and a valve seat intermediate said ports, a timing cylinder disposed over and alined with said valve seat and connected with said inlet port by a restricted charging duct, a plunger movable in said cylinder, said plunger comprising a centrally apertured head member, a threaded tubular sleeve member depending from said head member and defining, with said aperture, a cylinder discharge port, plunger packing means disposed about said sleeve member beneath said head member and including a portion seatable upon said valve seat to constitute a valve therefor, a wire gauze washer disposed beneath said packing means and arranged to extend within said outlet port only when said valve is seated or closely adjacent its seat, thus restricting and dividing the fluid then passing said seat into a plurality of small streams, a nut threaded upon said sleeve member and clamping said head member, packing means and wire gauze washer in assembly, a control valve seated upon said head member, closing the aperture therethrough, and having a stem extending through said sleeve member, and means for tilting said valve stem to unseat said control valve.

6. In a flush valve, a casing having an inlet port, an outlet port and a valve seat intermediate said ports, a main valve element associated with said seat, a timing chamber connected with said inlet port by a restricted charging duct, hydrostatic means for operating said main valve, said hydrostatic means constituting a wall of said timing chamber movable in accordance with variations in chamber pressure, a mushroom type control valve carried by said hydrostatic means having a head portion normally closing a chamber discharge port therethrough and having a stem portion extending through said discharge port, a slidable sleeve depending from and constituting an extension of said stem, sleeve adjusting means associated with the lower end of said stem and determining the limit of said extension, and means for laterally engaging said extension to unseat said control valve.

7. In a flushing valve of the character described, a casing having an outlet port opening therefrom and an inlet port, a valve member reciprocable on the axis of the outlet port to close said port at one limit of movement, means to operate the valve, an outlet passage longitudinally extended from the port, a valve having an extension axially movable in the passage, and a porous element on the extension initially within the passage next to the port and of an extent longitudinally of said axis less than the normal opening movement of the valve and movable with the valve member out of the port, said porous element being of substantially less diameter than the port and passage, whereby to afford a substantial clearance therearound when within the passage, whereby it is exposed to impact of liquid passing to the port when the valve is open at initial stages of opening movement and at terminal stages of closing movement.

8. In a flushing valve of the character described, a casing having an outlet port opening therefrom and an inlet port, a valve member reciprocable on the axis of the outlet port to close said port at one limit of movement, means to operate the valve, an outlet passage longitudinally extended from the port, the valve having an extension axially movable in the passage, and a porous element on the extension initially within the passage next to the port and of an extent longitudinally of said axis less than the normal opening movement of the valve and movable with the valve member out of the port, said porous element being of substantially less diameter than the port and passage and being so proportioned that a clearance occurs between the porous element and the port when the valve is closed or nearly closed, and whereby a substantially increased clearance occurs at maximum opening positions of the valve.

9. In a flushing valve of the character described, a casing having an outlet port opening therefrom and an inlet port, a valve member reciprocable on the axis of the outlet port to close said port at one limit of movement, means to operate the valve, an outlet passage longitudinally extended from the port, the valve having an extension axially movable in the passage, and a porous element on the extension initially within the passage next to the port and of an extent longitudinally of said axis less than the normal opening movement of the valve and movable with the valve member out of the port, said porous element being of laminated construction constituted by a multiplicity of superposed disc-like washers of woven wire fabric encircling said extension.

10. In a flushing valve of the character described, a casing having an outlet port opening therefrom and an inlet port, a valve member reciprocable on the axis of the outlet port to close said port at one limit of movement, means to operate the valve, an outlet passage longitudinally extended from the port, the valve having an extension axially movable in the passage, and a porous element on the extension initially within the passage next to the port and of an extent longitudinally of said axis less than the normal opening movement of the valve and movable with the valve member out of the port, said extension being formed with a circumscribing groove immediately adjacent the valve, and a plurality of washers fitted therein of substantially less diameter than the port and passage, said washers being stamped from wire cloth, whereby the extremities of the wires are projected in the direction of water moving toward the port when open.

FREDERICK C. BINNALL.